(12) United States Patent
Nakamura et al.

(10) Patent No.: US 6,442,218 B1
(45) Date of Patent: Aug. 27, 2002

(54) DEMODULATOR

(75) Inventors: Michiharu Nakamura; Yasuyuki Oishi; Kazuo Nagatani; Hajime Hamada; Yoshihiko Asano; Hiroyuki Seki; Yoshinori Tanaka, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/377,141

(22) Filed: Aug. 19, 1999

(30) Foreign Application Priority Data

Sep. 4, 1998 (JP) .......................... 10-251035

(51) Int. Cl.$^7$ ................................ H03D 1/00
(52) U.S. Cl. .................... 375/340; 375/341; 375/342; 375/346; 375/348; 375/324; 375/285; 375/278; 375/284; 370/500; 370/522; 370/525; 329/349; 329/353
(58) Field of Search ................ 375/261, 262, 375/268, 269, 284, 285, 287, 278, 324, 325, 329, 340–342, 346, 348; 370/480, 491, 500, 522, 525, 528, 526; 455/296, 309, 312, 63, 67.1; 329/349, 353, 371

(56) References Cited

U.S. PATENT DOCUMENTS

| | | | |
|---|---|---|---|
| 4,327,440 A | | 4/1982 | Furuya et al. |
| 5,263,033 A | | 11/1993 | Seshadri |
| 5,579,343 A | | 11/1996 | Ohmura |
| 5,809,083 A | * | 9/1998 | Wright ........................ 370/500 |
| 5,822,359 A | * | 10/1998 | Bruckert et al. ............. 370/209 |
| 5,901,185 A | * | 5/1999 | Hassan ........................ 370/522 |
| 5,907,583 A | * | 5/1999 | Sakoda et al. ............... 375/260 |
| 6,243,423 B1 | * | 6/2001 | Sakoda et al. ............... 375/262 |

FOREIGN PATENT DOCUMENTS

| | | |
|---|---|---|
| JP | 6-197141 | 7/1994 |
| JP | 8-149176 | 6/1996 |
| JP | 1051424 | 2/1998 |

OTHER PUBLICATIONS

Seichi Sampei: "Rayleigh Fading Compensation Method for 16QAM MODEM in Digital Land Mobile Radio Systems," The Journal of Electronics, Information, and Communication Engineers, vol. J72–B–II, No. 1, pp. 7–15 (1989).

* cited by examiner

*Primary Examiner*—Chi Pham
*Assistant Examiner*—Khanh Cong Tran
(74) *Attorney, Agent, or Firm*—Katten Muchin Zavis Rosenman

(57) ABSTRACT

The present invention relates to a demodulator which receives a signal transmitted via phase modulation or multivalue QAM modulation, and decides transmitted data based on the received signal. The present invention enhances a transmission-line estimate by using tentatively decided data symbols as pilot symbols and in estimating a transmission line without a decrease in accuracy of transmission-line estimate even when an error rate of the tentatively decided data symbols is increased. The demodulator includes a pilot-based transmission-line estimation unit for estimating transmission-line characteristics by using pilot symbols. A tentative-data-decision unit for tentatively deciding data symbols based on the pilot-based transmission-line estimate. A data-based transmission-line estimation unit for estimating the transmission-line characteristics by using the tentatively decided data. Weight-coefficient-multiplication units for multiplying pilot-based and data-based transmission-line estimates by respective weights having a ratio therebetween varying in accordance with reliability of the tentatively ascertained data. A pilot&data-based transmission-line estimation unit for obtaining a transmission-line estimate by averaging weighted transmission-line estimates.

17 Claims, 14 Drawing Sheets

DEMODULATOR

BACKGROUND OF THE INVENTION

The present invention relates to demodulators which receive a signal transmitted via phase modulation or multi-value QAM modulation, and derive transmitted data from the received signal. The present invention particularly relates to a demodulator used in a receiver of a digital-data-transfer system which transfers data, digital audio signals, digital image signals, or the like.

In the transfer of data, digital audio signals, digital image signals, or the like, symbol data representing binary values or multi-values as digital data is transmitted as carrier-wave modulated signals. The symbol data arrives at a receiver via a transmission line, and demodulator of the receiver decides the symbol data as digital data. The decided data is output from the receiver.

The transmitted signals suffer phase fluctuations as well as magnitude fluctuations because of interference from other communication and/or interference between paths along the transmission line on which a plurality of paths are established. The transmitted signals thus can be distorted before arriving at the receiver. Further, the received signals can further be distorted by noise inside the receiver.

If the distortion of the received signals generated is large, the demodulator cannot ascertain the transmitted symbol data correctly, and ends up outputting incorrect digital data. In order to insure high-quality communication of digital information, the demodulator needs to achieve higher reliability in deciding the symbol data, and needs to decrease data-error rates.

Transmission of digital data is performed by transmitting a signal with a carrier wave thereof modulated in terms of its amplitude or phase in accordance with the digital data to be transmitted. When the transmitted signal is received, however, the actually received signal has distortion introduced along the transmission line.

In consideration of this, a demodulator compensates for the distortion based on the estimation of characteristics of the transmission line, and, then, decides the digital data from the amplitude or phase of the received data. The decided data is supplied as a demodulator output. A well-known method of estimating characteristics of the transmission line includes transmitting predetermined pilot symbols and estimating the characteristics of the transmission line based on the received pilot symbols. This is disclosed in Seiichi Sampei, "Rayleigh Fading Compensation Method for 16 QAM Modem in Digital Land Mobile Radio Systems", Transaction of the Institute of Electronics, Information and Communication Engineers, Vol. J72-B-II, No. 1, pp.7–15 (1988), for example.

The above-described transmission-line-estimation method based on use of pilot symbols transmits at least one of N symbols as a pilot symbol when transmitting the N symbols in one slot. In particular, one pilot symbol is inserted and transmitted as (N−1) data symbols. The receiver then uses the pilot symbol to estimate the characteristics of the transmission line.

A complex envelope of a transmitted pilot symbol is denoted as (3+j·3), and a complex envelope characteristic (i.e., phasing distortion introduced during passage through the transmission line) is denoted as c(k). Further, a received complex base-band signal of the pilot symbol in the receiver is u(k), and a Gaussian white noise is represented as n(k). Then, the following relation is satisfied.

$$u(k)=c(k)\cdot(3+j\cdot 3)+n(k) \qquad (1)$$

On the receiver side, an operation as shown in the following (2) is performed on the received complex base-band signal u(k) by using the transmitted pilot symbol 3+j·3, so as to obtain an estimate of the transmission line c^(k).

$$c^\wedge(k) = u(k)/(3+j\cdot 3) \qquad (2)$$
$$= c(k) + n(k)/(3+j\cdot 3)$$

When the data symbol transmitted from the transmitter is s(k) and the data symbol received at the receiver is r(k), then, the received data symbol r(k) under the effect of the transmission-line characteristic c(k) is represented by the following.

$$r(k)=c(k)\cdot s(k)+n(k) \qquad (3)$$

An operation as shown in the following (4) is performed on the received data symbol r(k) by using the transmission-line estimate c^(k), so as to obtain the received data symbol r^(k) having the effect of the transmission line removed therefrom.

$$r^\wedge(k)=r(k)/c^\wedge(k) \qquad (4)$$

Here, r^(k) is equal to the transmitted data symbol s(k) if the Gaussian white noise n(k) is zero. In this case, the receiver side can reconstruct the transmitted data symbol s(k) without any effect of the transmission line.

The transmission-line estimate c^(k) becomes identical to the transmission-line characteristic c(k) if there is no Gaussian white noise n(k). Because of the effect of the Gaussian white noise n(k), however, there is a difference between the transmission-line estimate c^(k) and the transmission-line characteristic c(k). In consideration of this, the transmission-line estimate is obtained many times by using a plurality of pilot symbols, and an average is calculated to derive a transmission-line estimate that is highly accurate. Based on the highly accurate transmission-line estimate c^(k), which is obtained by averaging transmission-line estimates corresponding to the plurality of pilot symbols, a received data symbol is decided by removing the phasing deformation of the received data symbol through the operation as shown in the above equation.

As described in the above, a plurality of pilot symbols are required for the averaging operation in order to raise accuracy of the transmission-line estimate c^(k). Namely, p pilot symbols are inserted each time (N−p) data symbols are transmitted in one slot, and p transmission-line estimates are then averaged. An area where the p pilot symbols occupy is referred to as a pilot block.

An increase in the number p of pilot symbols relative to the number N of transmitted symbols, however, results in a decrease in the number of symbols transmitted as digital data, thereby ending up decreasing a data-transfer rate. Because of this, the number p of the pilot symbols cannot be unconditionally increased.

To cope with this situation, a CDMA demodulating device disclosed in Japanese Patent laid-open Application No. 10-51424 employs a scheme in which a weighted average is calculated with respect to estimates of a channel (transmission-line characteristic) after these estimates are obtained from pilot symbols contained in pilot blocks of a plurality of slots. Another scheme is to obtain an average between a channel estimate obtained from pilot blocks of a plurality of slots and an average of information symbols having polarization thereof corrected.

The method of obtaining a weighted average of transmission-line estimates with respect to pilot blocks of a plurality of slots is accompanied by a processing delay until transmitted symbols of the plurality of slots are received. This is because the estimates of the transmission line are obtained after the pilot blocks of the plurality of slots are received.

There is a need for an accurate estimation of the transmission line without increasing the number p of pilot symbols in one slot and without incurring a processing delay over the plurality of slots. To this end, data symbols placed between pilot symbols may be decided tentatively as digital data, and the transmission-line characteristics may be estimated from the decided data symbols by treating the decided data symbols as pilot symbols. This scheme brings about the same effect as increasing the number of pilot symbols, thereby enhancing an accuracy regarding the estimation of transmission-line characteristics.

In comparison to the transmission-line estimate obtained from known pilot symbols inserted on the transmitter side, when a transmission-line estimate is derived by using tentatively decided data symbols as pilot symbols, this estimate tends to be less reliable to an extend that the tentative ascertainment contains errors. When an error rate of the tentative decided data is large, the transmission-line estimate obtained from the tentatively decided data symbols may be even less reliable then before such data symbols are used.

SUMMARY OF THE INVENTION

An object of the present invention is to provide a demodulator which can improve a transmission-line estimate by using tentatively decided data symbols as pilot symbols, and, at the same time, avoids degradation in accuracy of the transmission-line estimate when an error rate of the tentatively decided data symbols grows large.

These and other objects are met by a demodulator according to the present invention which demodulates data symbols by estimating transmission-line characteristics from received pilot symbols. This includes a pilot-based transmission-line-estimation unit which estimate the transmission-line characteristics by using the pilot symbols. A tentative-data-decision unit which tentatively decides the data symbols based on a transmission-line estimate that is output from the pilot-based transmission-line-estimation unit. A data-based transmission-line-estimation unit which estimates the transmission-line characteristics by using tentatively decided data that is output from the tentative-data-ascertainment unit. Multiplying units which multiply the transmission-line estimate output from the pilot-based transmission-line-estimation unit and a transmission-line estimate output from the data-based transmission-line-estimation unit by respective weights. A ratio between the weights varying in accordance with reliability of the tentatively decided data. A pilot&data-based transmission-line estimation unit which obtains a transmission-line estimate by averaging weighted transmission-line estimates output from the multiplying units. A final-data-decision unit which finally decides the data symbols by using the transmission-line estimate output from the pilot&data-based transmission-line-estimation unit.

The demodulator is characterized in that the tentative-data-ascertainment unit outputs a signal indicative of reliability of the tentatively decided data based on a result of soft decision of the received data symbols. The multiplying unit which multiplies the transmission-line estimate output from the data-based transmission-line estimation unit by one of the respective weights changes the one of the respective weights in accordance with the signal indicative of reliability of the tentatively decided data.

The demodulator is characterized in that the signal indicative of reliability of the tentatively ascertained data represents at least two different reliability levels, and the multiplying unit which multiplies the transmission-line estimate output from the data-based transmission-line estimation unit by the one of the respective weights makes step changes to the one of the respective weights in accordance with the signal representing the at least two different reliability levels.

The demodulator is characterized by further comprising a transmission-mode-check unit which checks a transmission mode of digital-data-transmission signals, wherein the transmission-mode-check unit outputs a signal indicative of reliability of the tentative-data-ascertained data where the reliability varies depending on the transmission mode. The multiplying units use the respective weights having the ratio therebetween varying depending on the signal indicative of reliability of the tentatively decided data supplied from the transmission-mode-check unit.

The demodulator is characterized by receiving and demodulating signals directed to other receivers or transmitted via other channels when the signals are transmitted from a single transmission source. The pilot-based transmission-line estimation unit, the data-based transmission-line estimation unit, and the multiplying units are provided with respect to each of a signal directed to a receiver of the demodulator and the signals directed to other receivers or transmitted via other channels. The pilot&data-based transmission-line estimation unit obtains a weighted average of the pilot-based transmission-line estimate in accordance with the reliability of the tentatively decided data with respect to all signals including the signal directed to the receiver of the demodulator and the signals directed to other receivers or transmitted via other code channels, thereby obtaining a transmission-line estimate.

A demodulator which demodulates data symbols by estimating transmission-line characteristics from received pilot symbols, includes a pilot-based transmission-line estimation unit which estimate the transmission-line characteristics by using the pilot symbols. A first tentative-data-decision unit which tentatively decides the data symbols based on a transmission-line estimate that is output from the pilot-based transmission-line estimation unit. A first data-based transmission-line estimation unit which estimates the transmission-line characteristics by using tentatively ascertained data that is output from the first tentative-data-ascertainment unit. First multiplying units which multiply the transmission-line estimate output from the pilot-based transmission-line estimation unit and a transmission-line estimate output from the first data-based transmission-line estimation unit by respective weights, which are varied in accordance with reliability of the tentatively ascertainment data. A first pilot&data-based transmission-line estimation unit which obtains a transmission-line estimate by averaging weighted transmission-line estimates output from the first multiplying units. A second tentative-data-decision unit which tentatively decides the data symbols again based on the transmission-line estimate that is output from the first pilot&data-based transmission-line estimation unit. A second data-based transmission-line estimation unit which estimates the transmission-line characteristics by using tentatively decided data that is output from the second tentative-data-decision unit.

Second multiplying units which multiply the transmission-line estimate output from the pilot-based transmission-line estimation unit, the transmission-line estimate output from the first data-based transmission-line estimation unit, and a transmission-line estimate output from the second data-based transmission-line estimation unit by respective weights, which are varying in accordance with reliability of the tentatively ascertained data. A second pilot&data-based transmission-line estimation unit which obtains a transmission-line estimate by averaging weighted transmission-line estimates output from the second multiplying units, and a final-data-decision unit which finally decides the data symbols by using the transmission-line estimate output from the second pilot&data-based transmission-line estimation unit.

The demodulator is characterized in that the first and second tentative-data-ascertainment units, the first and second data-based transmission-line estimation units, the first and second multiplying units, and the first and second pilot&data-based transmission-line estimation units perform tentative data decisions, estimation of the transmission-line characteristics based on the tentatively decided data. Multiplication of the respective weights, which are varied in accordance with reliability of the tentatively decided data or the respective weights varying in accordance with reliability of the tentatively decided data and depending on which stage is current. Estimation of the transmission-line characteristics based on the pilot and tentatively decided data, respectively, repeatedly over many stages.

DETAILED DESCRIPTION

Figure 1:
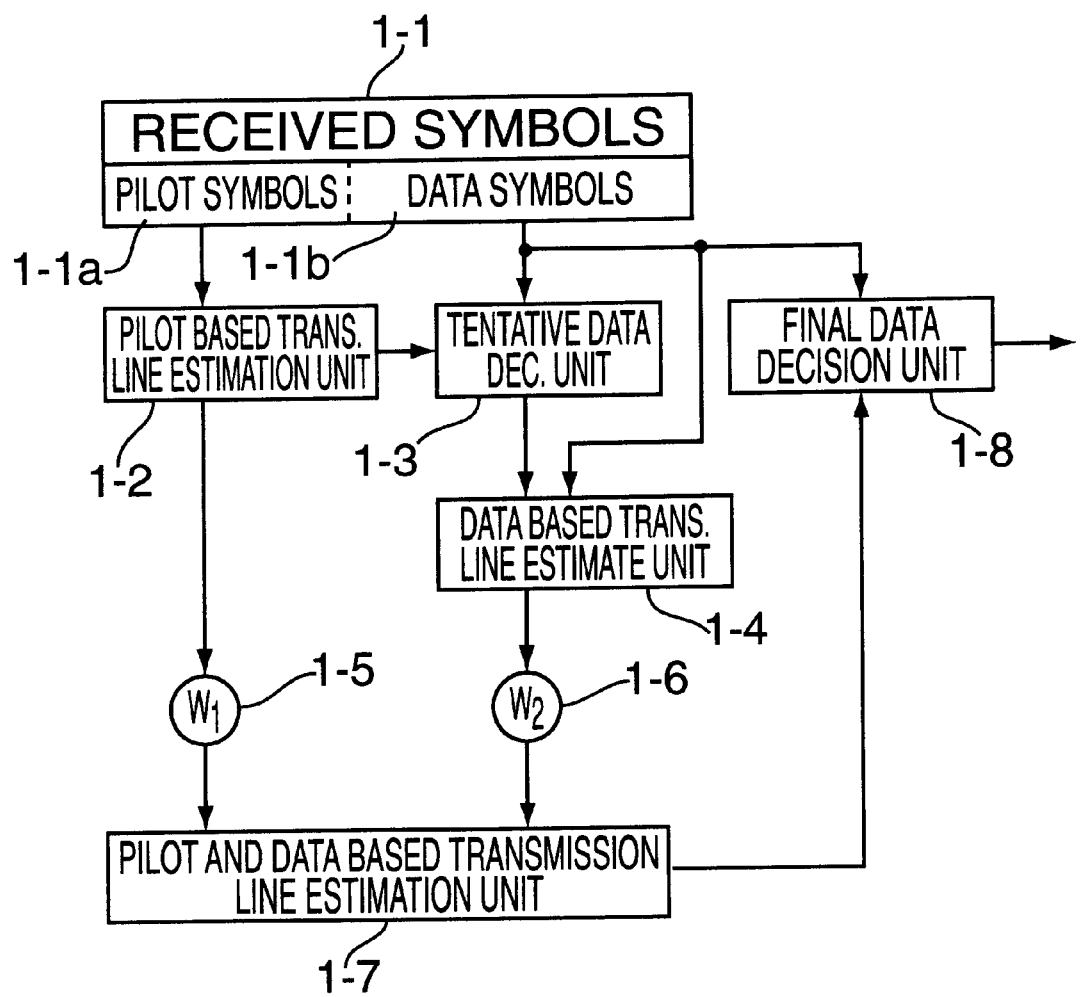
FIG. 1 is a block diagram showing a basic configuration of the first embodiment of the present invention.

FIG. 1 shows a basic configuration of a first embodiment of the present invention. FIG. 1 shows received symbols 1-1 of one slot, pilot symbols 1-1$a$ of the received symbols, data symbols 1-1$b$ of the received symbols, a pilot-based transmission-line-estimation unit 1-2, a tentative-data-decision unit 1-3, a data-based transmission-line-estimation unit 1-4, a first weight-coefficient-multiplication unit 1-5, a second weight-coefficient-multiplication unit 1-6, a pilot&data-based transmission-line-estimation unit 1-7, and final-data-decision unit 1-8.

The received symbols 1-1 contains N received symbols, which consists of p pilot symbols 1-1$a$ and (N–p) data symbols 1-1$b$. The pilot symbols 1-1$a$ are supplied to the pilot-based transmission-line-estimation unit 102. The pilot-based transmission-line-estimation unit 1-2 obtains the transmission-line-estimate c^(k) by applying the operation of the equation (2), and then, supplies the estimate to the tentative-data-decision unit 1-3.

The tentative-data-decision unit 1-3 applies the operation of the equation (4) to the data symbols 1-1$b$ using the transmission-line-estimate c^(k), thereby eliminating the effect of the transmission line to tentatively decide the received data symbols as digital data. The tentatively decided data is then supplied to the data-based transmission-line-estimation unit 1-4.

Based on the tentatively decided data, the data-based transmission-line-estimation unit 1-4 performs the same operation as that of estimating the transmission line based on the pilot symbols. Namely, the data-based transmission-line-estimation unit 1-4 obtains an estimate of the transmission line by using the received data symbols based on an assumption that the tentatively decided digital data is identical to actually transmitted data symbols.

As previously described, the data decision operation of the tentative-data-decision unit 1-3 is not free from errors because of noise or the like. Because of this, the transmission-line-estimate output from the pilot-based transmission-line-estimation unit 1-2 is different from the transmission-line estimate output from the data-based transmission-line-estimation unit 1-4 in terms of reliability thereof. Obviously, the transmission-line-estimate output from the pilot-based transmission-line-estimation unit 1-2 is more reliable in general.

To take this reliability difference into consideration, the first weight-coefficient-multiplication unit 1-5 is provided for the purpose of attaching a weight to the transmission-line-estimate when the estimate is output from the pilot-based transmission-line-estimation unit 1-2. Further, the second weight-coefficient-multiplication unit 1-6 is provided for the purpose of attaching a weight to the transmission-line-estimate when the estimate is output from the data-based transmission-line-estimation unit 1-4. The weight attached by the first weight-coefficient-multiplication unit 5-1 is set to be greater then the weight attached by the second weight-coefficient-multiplication unit 1-6. The pilot&data-based transmission-line-estimation unit 1-7 obtains an average of the weighted transmission-line-estimates so as to output a transmission-line-estimate that is more reliable and accurate.

The transmission-line-estimate output from the pilot&data-based transmission-line-estimation unit 1-7 is supplied to the final-data-ascertainment unit 1-8. By using the transmission-line-estimate obtained as the weighted average, the final-data-ascertainment unit 1-8 eliminates the effect of the transmission line from the data symbols 1-1$b$, and decides them as digital data.

In this manner, the pilot symbols and the tentatively decided data symbols placed therebetween are used for obtaining estimates of the transmission-line characteristics. Further, a weighted average is calculated from these estimates by attaching weights in accordance with the reliability of respective estimates. The transmission-line-estimate obtained in this manner is more accurate than that obtained by simply averaging these estimates. Based on this highly accurate estimate of the transmission line, the final-data-decision unit 1-8 demodulates data symbols, thereby enhancing the reliability of the demodulated digital data.

Figure 2:
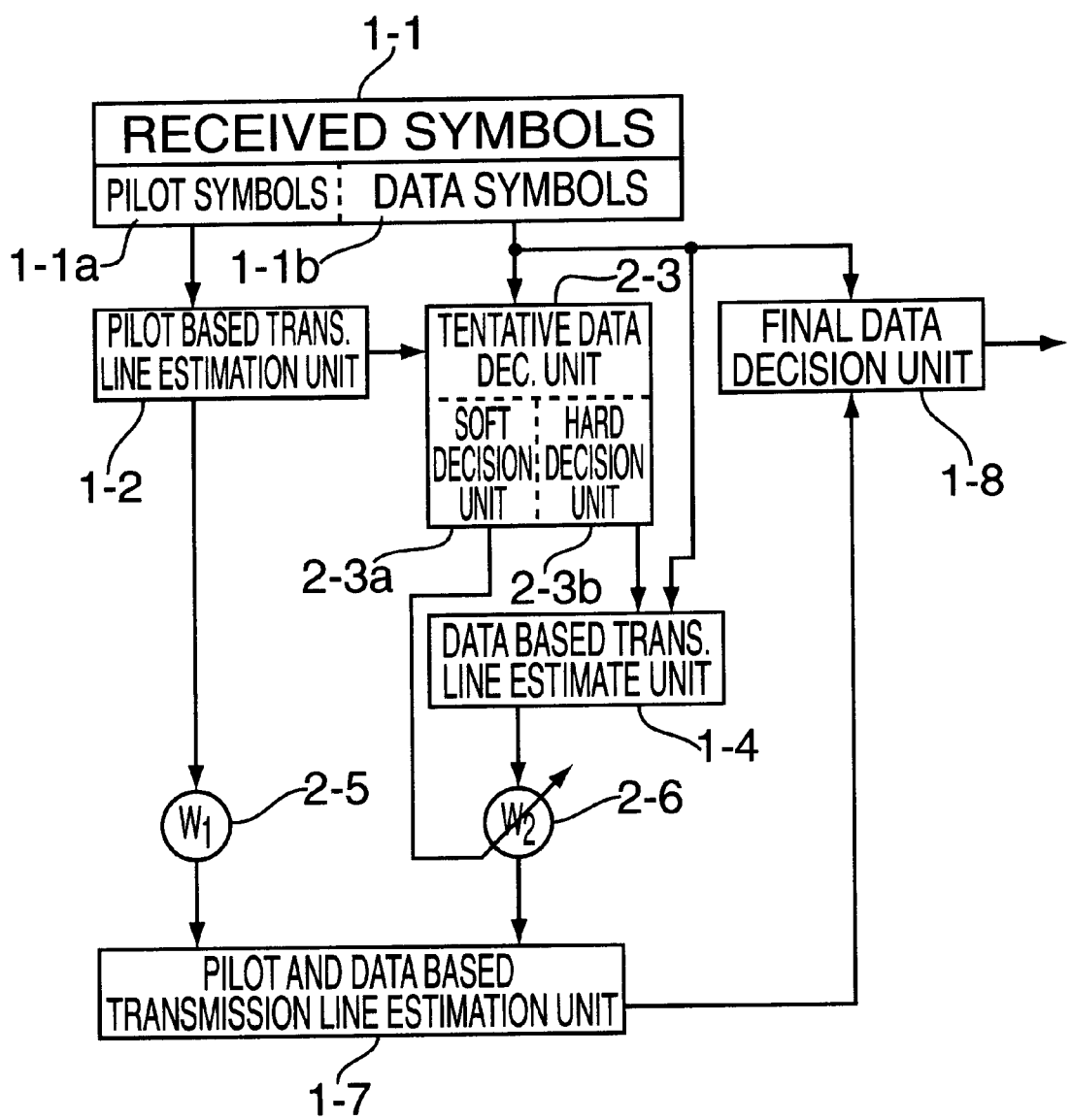
FIG. 2 is a block diagram showing a basic configuration of the second embodiment of the present invention.

FIG. 2 shows a basic configuration of a second embodiment of the present invention. In this embodiment, the tentative-data-decision unit 1-3 described in the first embodiment is configured such that a soft decision can be performed on the received data symbols. Thus, the reliability of the tentatively ascertained data is estimated based on the results of the soft decision, so that weights of transmission-line-estimates can vary according to the results of the soft ascertainment.

In FIG. 2, the same elements as those of FIG. 1 are referred to by the same numerals, and a description thereof will be omitted if it has been already given. The basic configuration of the second embodiment shown in FIG. 2 is such that a tentative-data-decision unit 2-3 includes a soft-decision unit 2-3a for carrying out a soft decision and a hard-decision unit for carrying out a hard decision. Results of a soft decision supplied from the soft-decision unit 2-3a are used for changing coefficients (weighs attached to transmission-line-estimates obtained from tentatively ascertained data) in a second weight-coefficient-multiplication unit 2-6.

The soft decision unit 2-3a decides data symbols by phase components thereof with threshold values. (In the case of QAM, amplitude components are also subjected to a comparison.) On the other hand, the hard-decision unit 2-3b decides data symbols by comparing phase components thereof with a threshold value without keeping the amplitude components thereof unchanged. (In the case of QAM, amplitude components are also subjected to a comparison). In this regard, the tentative-data-decision unit 1-3 of the first embodiment may be of a type that carries out a hard decision.

In what follows, a description will be given with respect to a relation between the amplitude components obtained from the soft decision of received data symbols and the reliability of the decision of the data symbols. Here, a QPSK signal will be used as an example. As a QPSK signal, data symbols A,B,C and D having four different phases are transmitted. The data symbols A,B,C and D have complex envelopes (1+j·1), (1−j·1), (−1+j·1), and (−1−j·1), respectively.

If a signal r=(x+j·y) is received with a probability p(r), the probability p(r) is represented as:

$$P(r)=P(r|A)\cdot P(A)+P(r|B)\cdot P(B)+P(r|C)\cdot P(C)+P(r|D)\cdot P(D) \quad (5)$$

Here, P(r|A), P(r|B), P(r|C), and P(r|D) are conditional probabilities representing a likelihood of receiving the signal r under the condition that corresponding data symbols A, B, C and D are transmitted, respectively. P(A), P(B), P(C ), and P(D) are probabilities that the data symbols A,B,C and D are transmitted, respectively.

When the signal r is received, a probability P(A|r) that the transmitted symbol was A is represented by the following equation (6).

$$P(A|r)=P(r|A)\cdot P(A)/P(r) \quad (6)$$

When the received signal r falls within such a category as is decided as a transmission data symbol A, this probability represents a likelihood of correctly deciding and demodulating data.

Further, a probability P(B, C, D|r) represents a likelihood that a transmitted data symbol is other than A under the condition that the signal r=(x+j·y) falling within such a range as should be ascertained as a data symbol A is received. This probability P(B, C, D|r) is represented as follows:

$$P(B, C, D|r)=1-P(A|r) \quad (7)$$

The equation (7) gives a probability of having an incorrect data decision. When decided data is incorrect, a transmission-line estimate obtained from the incorrect decision data has a significant error (error from the real transmission-line characteristic). In consideration of this, a larger weight is given to a received data symbol when this data symbol is likely to be decided correctly, and a smaller weight is given to a received data symbol when this data symbol is likely to be decided incorrectly. This provides a highly accurate transmission-line estimate.

Here, it is assumed that the probabilities P(A), P(B), P(C), and P(D) representing a chance of transmitting respective data symbols A, B, C and D are equal to each other, and, thus, are ¼. Further, it is assumed that the transmission line has Gaussian noise added thereto, and that a signal detection in complete synchronization is performed. Under these conditions, the probability P(A|r) of the received signal r=(x+j·y) being correctly decided is represented as follows:

$$P(A|r)=\sigma/(\alpha+\beta+\Gamma+\delta) \quad (8)$$

$$\alpha=\tfrac{1}{2}\pi\sigma^2)\cdot\exp(\{(x-1)^2+(y-1^2)\}/2\sigma^2)\cdot(\tfrac{1}{4})$$

$$\beta=1/(2\pi\sigma^2)\cdot\exp(\{(x-1)^2+(y-1)^2\}/2\sigma^2)\cdot(\tfrac{1}{4})$$

$$\Gamma=1/(2\pi\sigma^2)\cdot\exp(\{(x-1)^2+(y-1)^2\}/2\sigma^2)\cdot(\tfrac{1}{4})$$

$$\delta=1/(2\pi\sigma^2)\cdot\exp(\{(x-1)^2+(y-1)^2\}/2\sigma^2)\cdot(1.4)$$

$\sigma^2$: variance of the noise

Figure 7:
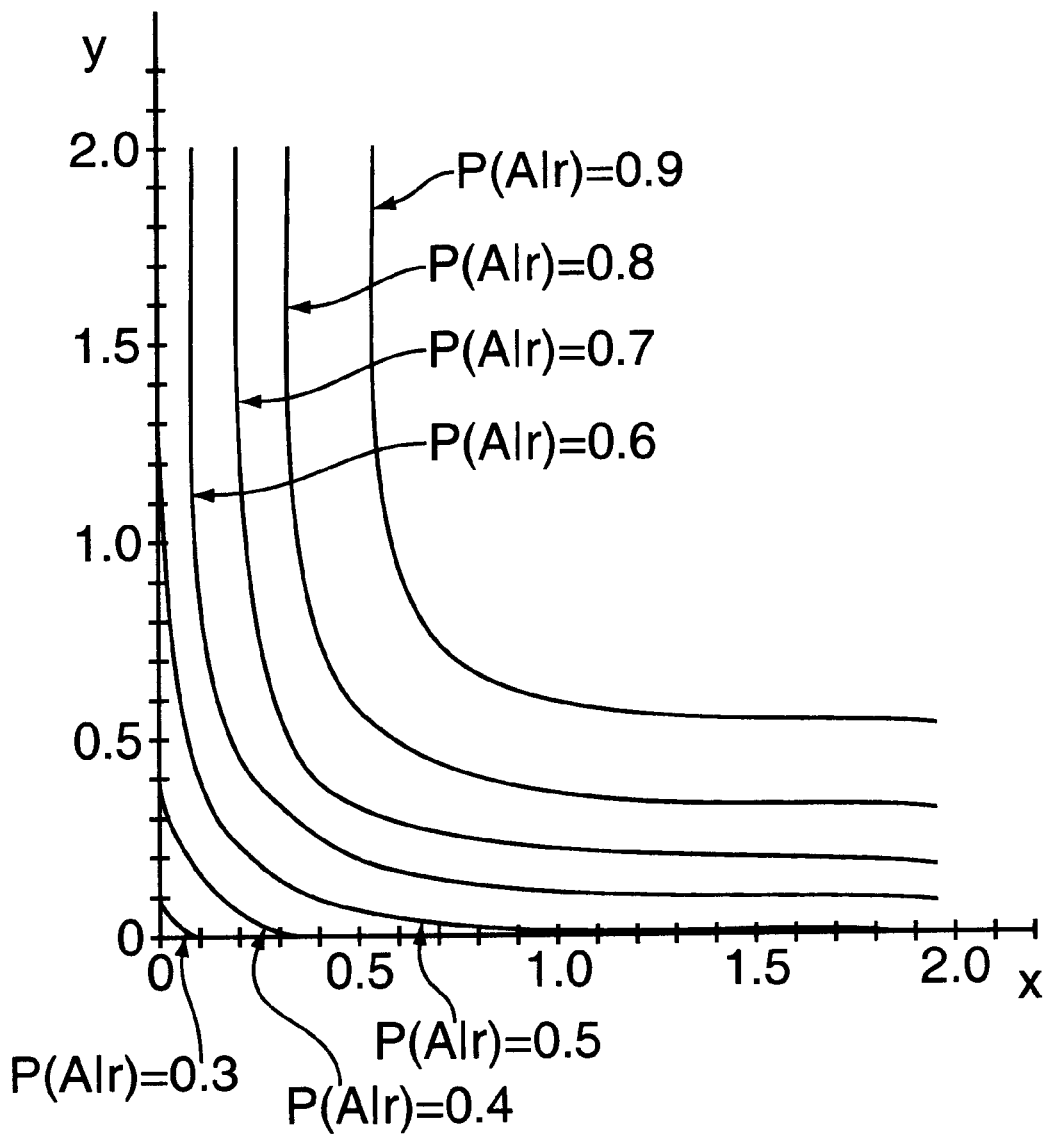
FIG. 7 is a chart showing probability P(A/r) that data is correctly decided.

The probability P(A|r) of a correct data decision as shown in the equation (8) is calculated with respect to a case of σ=0.2 (corresponding to a case where Eb/No=3 dB), and obtained results are shown in FIG. 7. Here, $\sigma^2$ is a noise variance.

The abscissa of FIG. 7 is a real part x of the received signal r=(x+J·y), and the ordinate is an imaginary part y thereof In the figure, curves represent values x and y for which the probability P(A|r) of a correct data decision is 0.3, 0.4, 0.5,0.6, 0.7, 0.8, and 0.9, respectively. As shown in the figure, the larger the values x or y, i.e., the larger the amplitude components of the received symbol, the greater the probability P(A|r) of a correct data ascertainment. Although the figure shows only an area where both x and y are positive, the same trend is observed in other areas.

Accordingly, reliability of the tentative data decision is estimated based on a position of the received signal r=(x+j·y), which is obtained as a result of the soft decision. This allows a weight to a transmission-line estimate obtained from the tentatively decided data to be varied based on the results of the soft decision. Namely, a variable weight is attached to the transmission-line estimate in accordance with the reliability of the tentative data decision. This provides a highly accurate transmission-line estimate.

Figure 3:
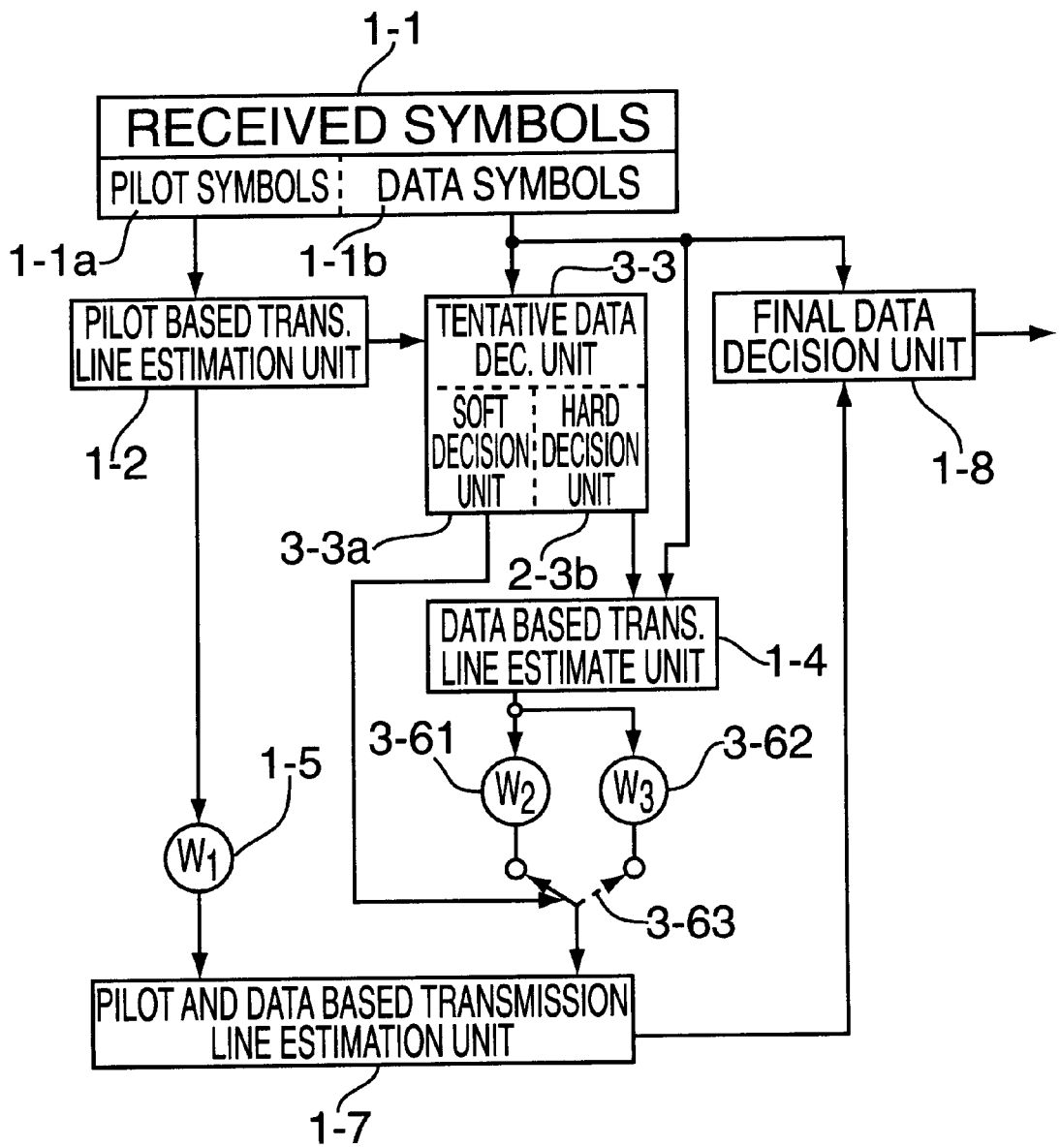
FIG. 3 is a block diagram showing a basic configuration of the third embodiment of the present invention.

FIG. 3 shows a basic configuration of a third embodiment of the present invention. In FIG. 3, the same elements as those of FIG. 1 and FIG. 2 are referred to by the same numerals. In FIG. 3, a soft-decision unit 3-3a decides whether the received data symbol has an amplitude component thereof exceeding a predetermined threshold value. Multiplication units 3-61, 3-62 have respective coefficients, which are set in advance. A switching unit 3-63 switches between the multiplication unit 3-61 and the multiplication unit 3-62, depending upon the result of soft decision.

In the third embodiment of FIG. 3, the soft-decision unit 2-3a of the second embodiment shown in FIG. 2 is revised so as to check whether the received signal r=(x+j·y) belongs to an area where a data decision is likely to be incorrect, and outputs only a result of the check. In this configuration, a check is made only as to whether the received data symbol has an amplitude component thereof exceeding a predetermined threshold value. This simple check can provide an equivalently effective judgment in comparison with the check of the previous embodiment.

In accordance with the check result, the switching unit 3-63 switches between the multiplication unit 3-61 and the multiplication unit 3-62 so as to use either one of two predetermined weights as a multiplication factor.

This embodiment is a simplified version of the second embodiment in a sense that the variable weight is classified into two categories, and allows a device configuration to be simplified while maintaining a highly accurate transmission-line estimate. As a demand for accuracy of the transmission-line estimate grows, the number of weight categories can be increased from two to three or more. Such a configuration permits a fine and gradual setting of a weight while maintaining a simplified configuration.

Figure 4:
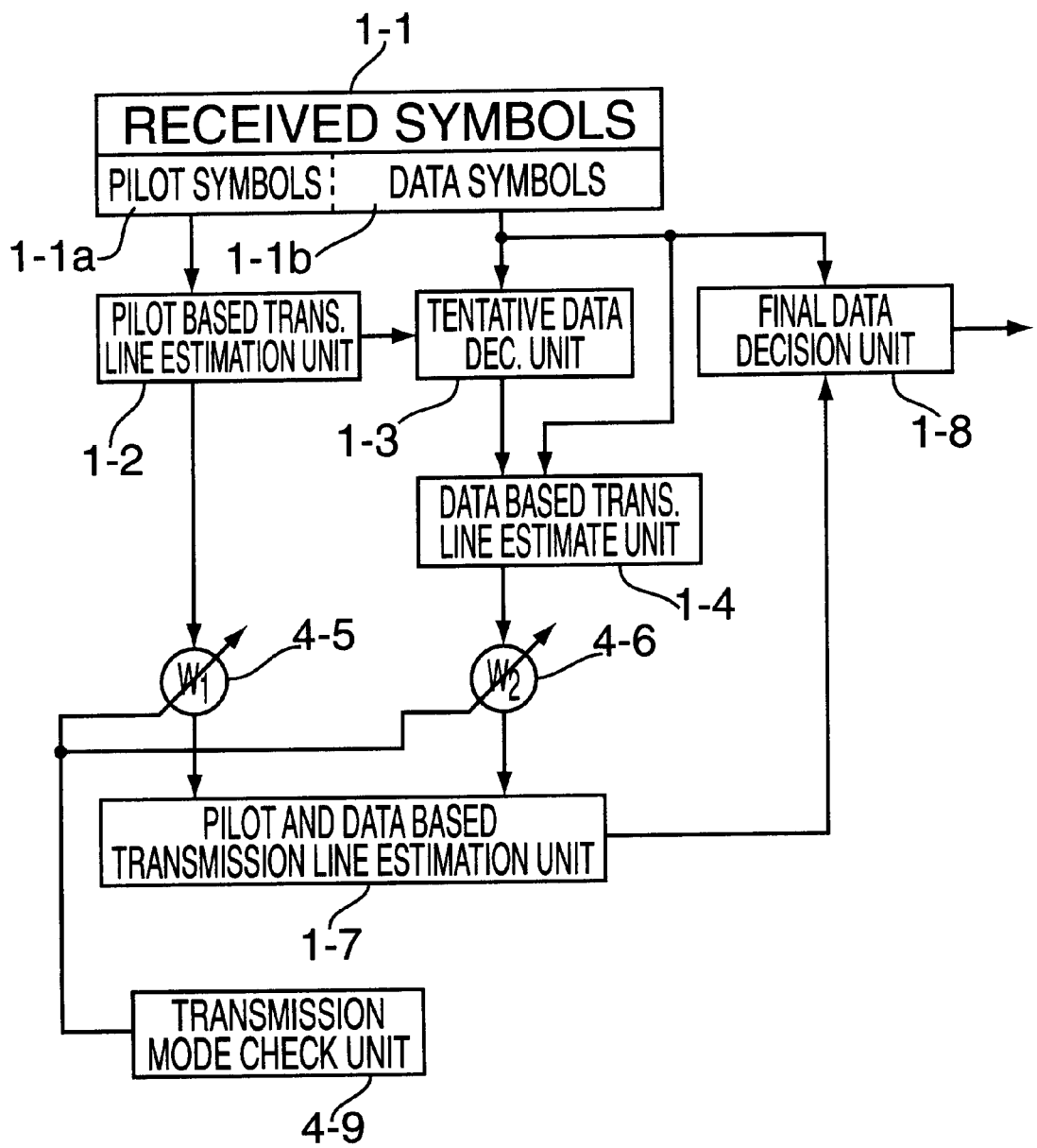
FIG. 4 is a block diagram showing a basic configuration of the fourth embodiment of the present invention.

FIG. 4 shows a basic configuration of a fourth embodiment of the present invention. In FIG. 4, the same elements as those of FIG. 1 are referred to by the same numerals. In FIG. 4, a transmission-mode-check unit 4-9 checks a transmission mode of a digital-data-transmission signal. Multiplication units 4-5, 4-6 change weights in accordance with an output of the transmission-mode-check unit 4-9.

In the fourth embodiment, the transmission-mode-check unit 4-9 is used for checking a mode of a digital-data-transmission signal, i.e., checking a ratio of the number of pilot symbols to the number of data symbols, checking a transmission bit rate, etc. Based on the result of the check, the multiplication unit 4-5 and the multiplication unit 4-6 change a ratio of a weight attached to the transmission-line estimate derived from the pilots to a weight attached to the transmission-line estimate derived from the tentatively ascertained data.

When the transmission mode indicates that a ratio of the number of the pilot symbols to the number of the data symbols is relatively large, the weight attached to the transmission-line estimate obtained from the pilot symbols in increased. Otherwise, this weight is decreased. In this manner, accuracy of the transmission-line estimate is kept at the optimal level.

Further, when the transmission bit rate is relatively great, a weight attached to the transmission-line estimate derived from the tentatively decided data is decreased. This is aimed at countering the degradation of reliability of the tentatively ascertained data as this is caused in this case by a relatively small energy associated with one bit. In this matter, weights are varied in accordance with the type of the data-transmission mode since the data-transmission mode relates to the reliability of the tentatively ascertained data. This provides an accurate estimate of the transmission line.

In what follows, a fifth embodiment of the present invention will be described. In the fifth embodiment, symbols transmitted from a transmission station may be received by a receiver regardless of whether these symbols are sent to the receiver or sent to other receivers and regardless of whether these symbols are sent via a pertinent code channel or via other code channels. All of the symbols received in such a manner are used in order to enhance an accuracy of the transmission-line estimate.

When digital data is transmitted from a transmission station and directed not only to a pertinent receiver but also to other receivers, or when digital data is broadcast to each mobile station, signals directed to the other receivers or transmitted via other code channels may be picked up by the pertinent receiver, and such signals must come through the same transmission line as long as these signals are sent from the single transmission source. These received signals are used for obtaining a plurality of transmission-line estimates, which are then incorporated into the calculation of an average, thereby providing a more accurate estimate of the transmission line.

Figure 5:
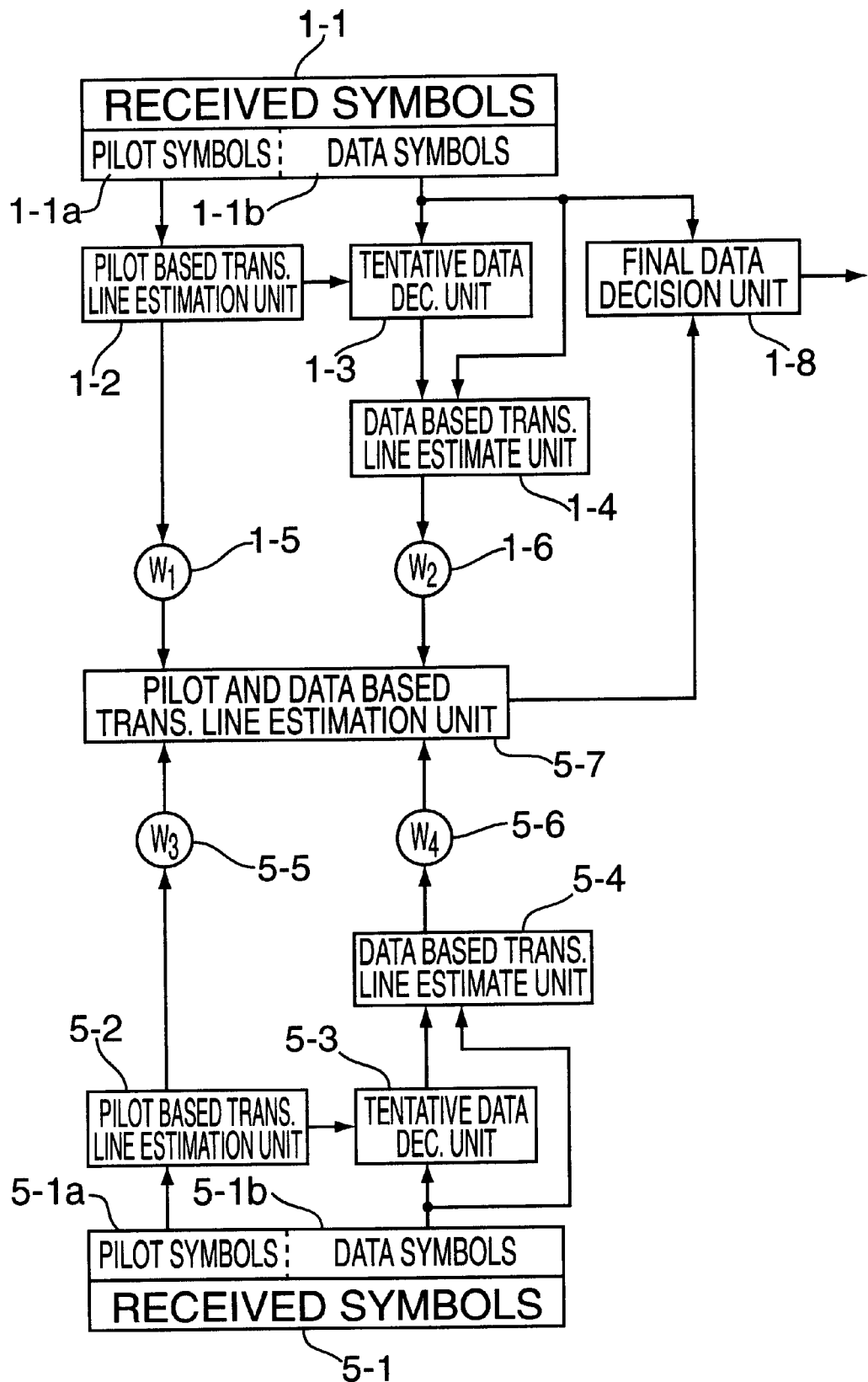
FIG. 5 is a block diagram showing a basic configuration of the fifth embodiment of the present invention.

FIG. 5 shows a basic configuration of a fifth embodiment of the present invention. In FIG. 5, the same elements as those of FIG. 1 are referred to by the same numerals. In FIG. 5, reference numbers 5-1 through 5-6 are configured so as to attend to a process for estimating a transmission line with regard to signals directed to other receivers and signals transmitted via other code channels.

In FIG. 5, received symbols 5-1 are included in one slot of a signal directed to another receiver or a signal transmitted through another code channel. Pilot symbols 5-1$a$ and data symbols 5-1$b$ are also included therein. A configuration of FIG. 5 also includes a pilot-based transmission-line-estimation unit 5-2, a tentative-data-decision unit 5-3, a data-based transmission-line estimation unit 5-4, a third weight-coefficient-multiplication unit 5-5, a fourth weight-coefficient-multiplication unit 5-6, and a pilot&data-based transmission-line estimation unit 5-7. The pilot&data-based transmission-line estimation unit 5-7 averages transmission-line estimates with respect to pilots and tentatively decides data when these estimates are obtained from the signal directed to another receiver or the signal transmitted through another code channel.

In FIG. 5, the elements having the reference numbers 1-1, 1-6 are the same as those shown in FIG. 1 or the like, and attend to a process for estimating a transmission line with regard to a signal directed to the receiver and transmitted via the pertinent channel. The elements having the reference numbers 5-1, 5-6 perform the same process as that performed by the elements 1-1, 1-6 except that this process is directed to the signal directed to another receiver or the signal transmitted via another code channel.

The pilot&data-based transmission-line estimation unit 5-7 obtains an average of the transmission-line estimates with respect to the signal directed to the receiver and transmitted via the pertinent code channel, and the signal directed to another receiver or transmitted via another code channel when these estimates are derived from the pilot symbols and the tentatively decided data. The averaging is carried out after attaching appropriate weights in the weight-coefficient-multiplication units 1-5, 1-6, 5-5, and 5-6 in accordance with reliability of the respective estimates. In this manner, a more accurate estimate of the transmission line can be obtained.

Figure 6:
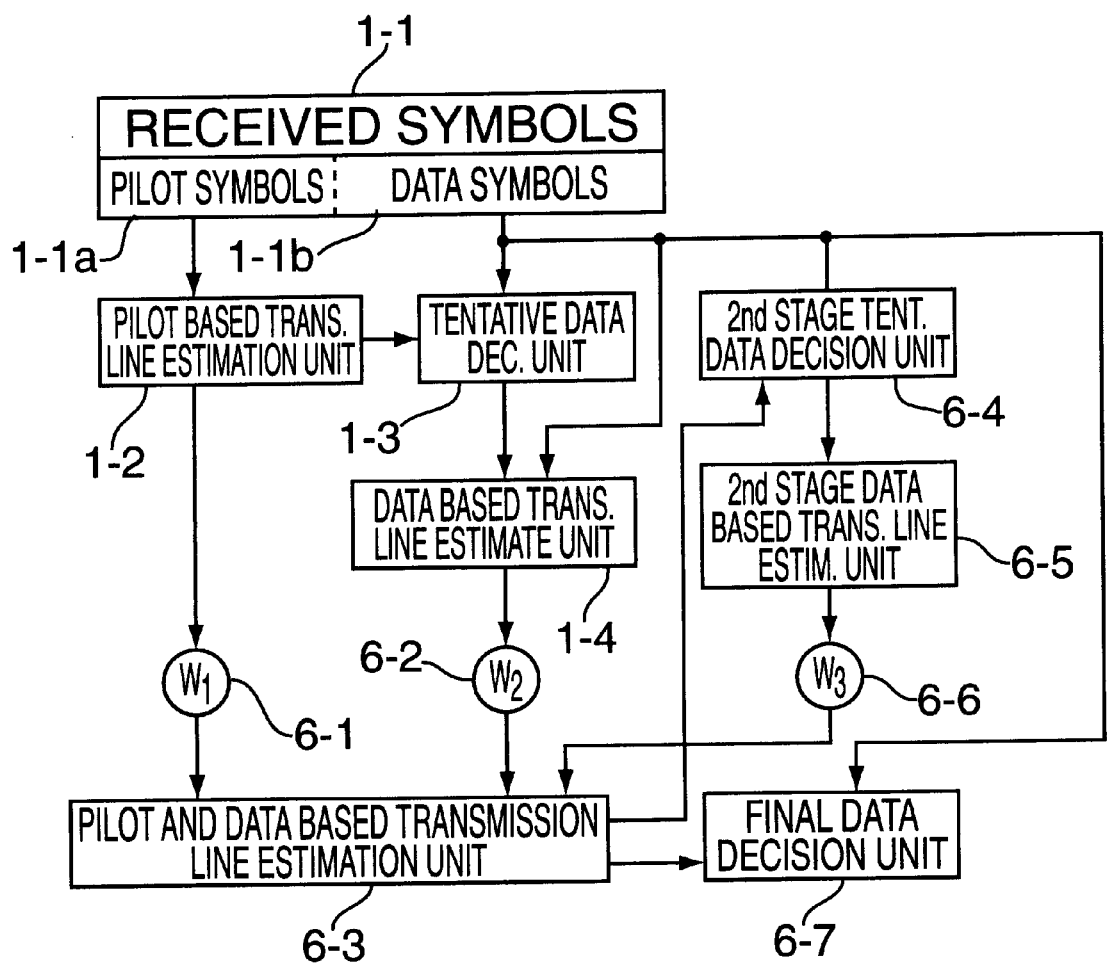
FIG. 6 is a block diagram showing a basic configuration of the sixth embodiment of the present invention.

FIG. 6 shows a basic configuration of a sixth embodiment of the present invention. In FIG. 6, the same elements as those of FIG. 1 are referred to by the same numerals. In FIG. 6, weight-coefficient-multiplication units 6-1, 6-2 attach weights by using one of the weighting schemes of the first through fifth embodiments previously described or by using a combination thereof. Outputs of the weight-coefficient-multiplication units 6-1, 6-2 are supplied to a pilot&data-based transmission-line estimation unit 6-3, where a weighted average of these outputs is calculated to provide a transmission-line estimate in the like manner as in the previous embodiments.

The transmission-line estimate is then used by a second-stage tentative-data-decision unit 6-4 to conduct a second tentative decision. Tentatively decided data is then output from the second-stage tentative-data-decision unit 6-4, and is used by a second-stage data-based transmission-line estimation unit 6-5 to obtain another transmission-line estimate.

The transmission-line estimate output from the second-stage data-based transmission-line estimation unit 6-5 is weighted by a second-stage weight-coefficient $(W_3)$-multiplication unit 6-6. The pilot&data-based transmission-line estimation unit 6-3 then obtains a weighted average of the transmission-line estimates supplied from the pilot-based transmission-line estimation unit 1-2, the data-based transmission-line estimation unit 1-4, and the second-stage data-based transmission-line estimation unit 6-5 by using respective weights, thereby providing a new transmission-line estimate.

The new transmission-line estimate output from the pilot&data-based transmission-line estimation unit 6-3 is used by a final-data-ascertainment unit 6-7 to carry out a final decision of received data symbols. The results of the final decision are supplied as the output of the demodulator.

In the embodiment of FIG. 6, a tentative decision of data and subsequent estimation of the transmission line based on the tentatively decided data are each performed twice. The tentative decision data and the estimation of the transmission-line based on the tentatively decided data may be repeated many times to further enhance accuracy of the transmission-line estimation.

Figure 8:
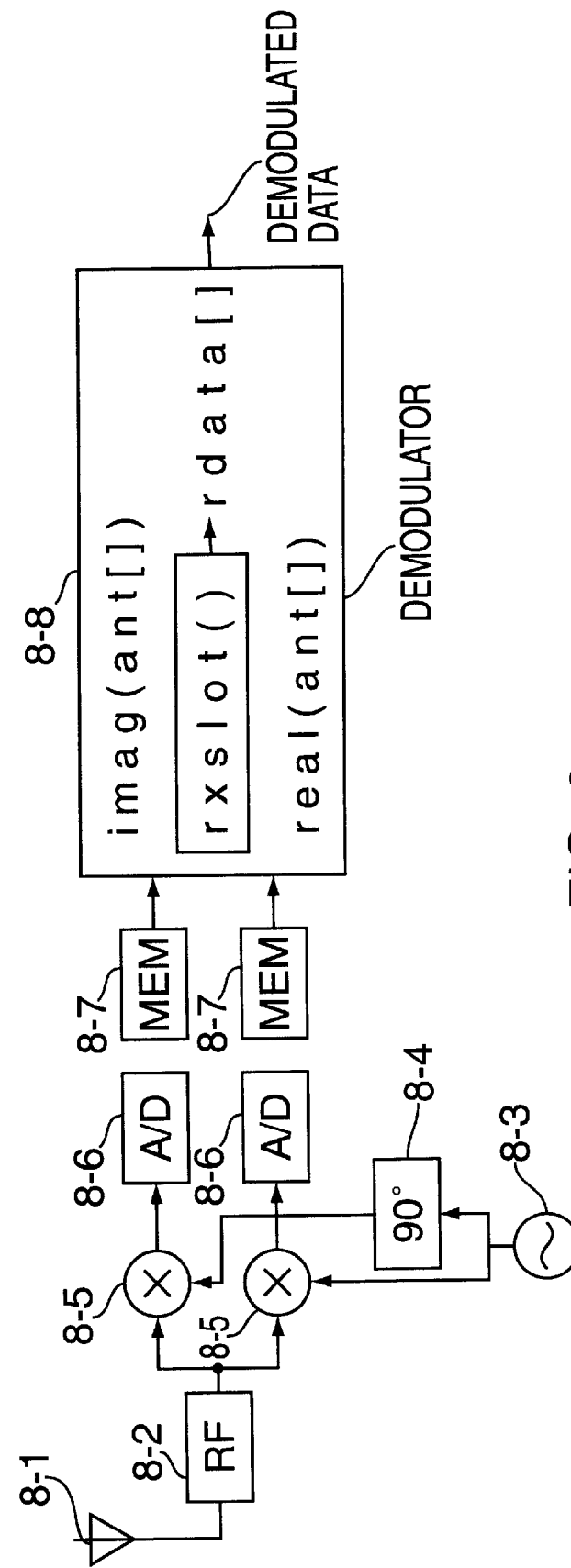
FIG. 8 is a block diagram showing a receiver including a demodulator according to the present invention.

FIG. 8 shows a configuration of a receiver including a demodulator according to the present invention. FIG. 8 shows an antenna 8-1, a high-frequency circuit 8-2, a local oscillator 8-3, a 90°-phase shifter 8-4, multiplying units 8-5, analog-to-digital converters 8-6, memories 8-7, and a demodulator 8-8.

A signal received by the antenna 8-1 is detected with respect to each orthogonal component thereof by the local oscillator 8-3, the 90°-phase shifter 84, and the multiplying units 8-5. Here, the 90°-phase shifter 8-4 shifts a phase of a signal by 90° when this signal is supplied from the local oscillator 8-3. The detected signals are then converted into digital signals by the analog-to-digital converters 8-6. After symbols of the digital signals for one slot are stored in the memories 8-7, these symbols are demodulated by the demodulator 8-8.

The demodulator 8-8 applies software-based signal processing to the digital signals stored in the memories 8-7 so as to demodulate the data. Digital signals ant(j) stored in the memories 8-7 are used as parameters, and a demodulation function rxslot( ) is called up to activate a demodulation program, thereby performing a demodulation process.

In the demodulation process, demodulated data, which is decided based on the digital signals ant(i) serving as a parameter, is stored in parameter rdata(j). This marks the end of the demodulation program. By replacing the demodulation function rxslot(), the demodulation process can be switched to that of one of the first to sixth embodiments of the present invention so as to introduce weights into the demodulation process.

Figure 9:
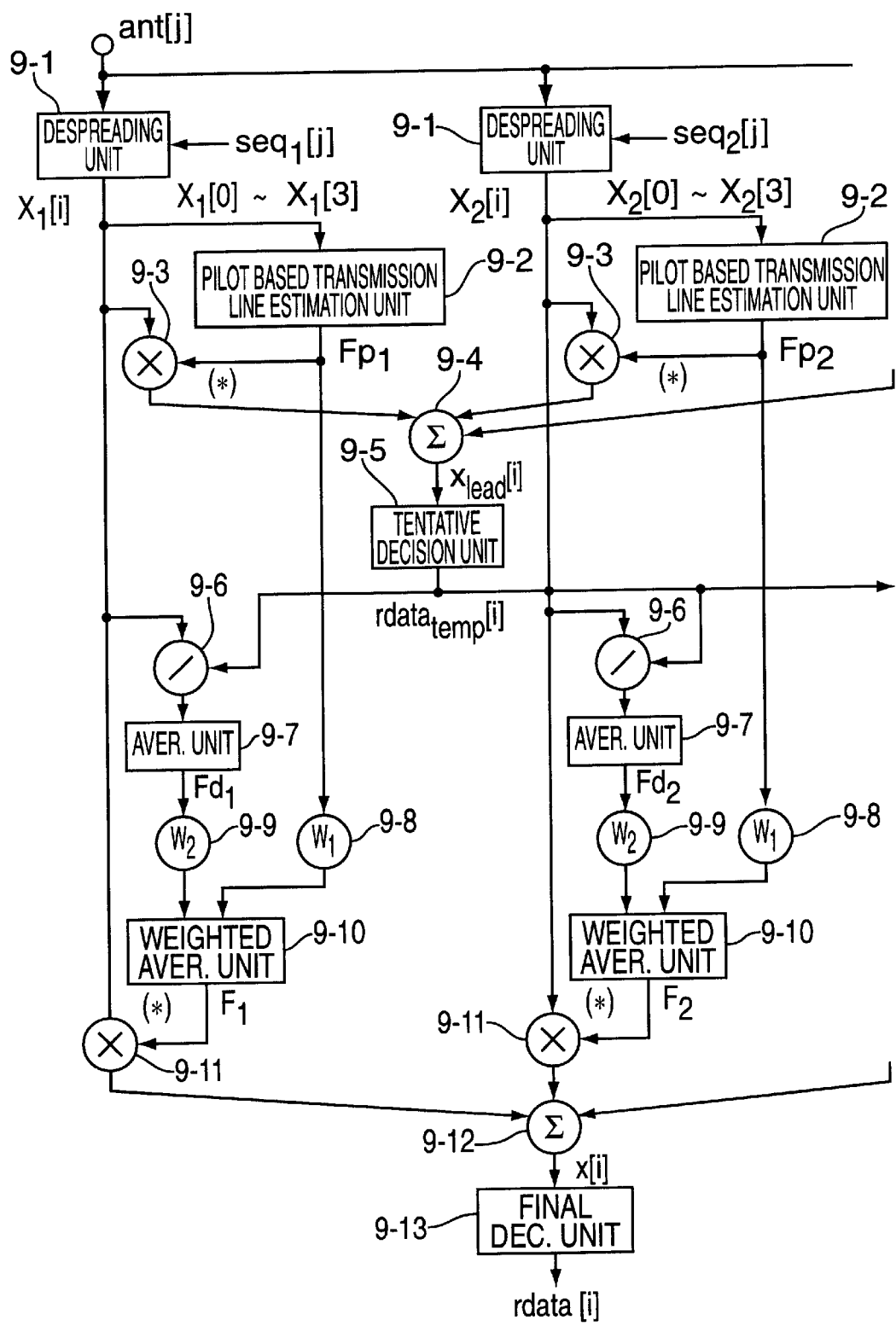
FIG. 9 is a drawing showing functional blocks of the first embodiment of the present invention.

FIG. 9 shows functional blocks of the first embodiment according to the present invention. The signal received by the antenna is supplied to despreading units 9-1 as a complex array ant(j). The despreading units 9-1 are provided for corresponding paths of the multiplexed transmission line, and apply despreading by using codes $seq_1(j)$, $seq_2(j)$, and so on having different timings. As a result, base-band received symbols $X_1(i)$, $X_2(i)$, and so on are obtained as outputs.

Some of the received symbols $X_1(i)$, $X_2(i)$ are pilot symbols. For example, symbols with suffix i of 0 through 3, i.e., the first four symbols, may be pilot symbols. Pilot-based transmission-line estimation units 9-2 obtain transmission-line estimates $Fp_1$, $Fp_2$, and so on, respectively, each of which is an average obtained over two or more pilot symbols.

Complex conjugates (*)of the pilot-based transmission-line estimates $Fp_1$, $Fp_2$, and so on are multiplied by the data symbols $X_1(i)$, $X_2(i)$, and so on, respectively, by multiplying units 9-3. Results of the multiplications are subjected to rake-diversity by combining unit 9-4 so as to generate a temporary rake-synthesis signal $X_{temp}(i)$.

A tentative-decision unit 9-5 compares the temporary rake combined signal $X_{temp}(i)$ with a threshold value so as to supply tentatively decided data $rdata_{temp}(i)$ which is then directed to dividing units 9-6. The dividing units 9-6 divide the data symbol $X_1(i)$, $X_2(i)$, and so on by the tentatively-ascertained data $rdata_{temp}(i)$. Further, averaging units 9-7 obtain an average over a plurality of data symbols to supply averaged transmission-line estimates $Fd_1$, $Fd_2$, and so on.

The pilot-based transmission-line estimates $Fp_1$, $Fp_2$, and so on and the data-based transmission-line estimates $Fd_1$, $Fd_2$, and so on are multiplied by respective weights $W_1$, $W_2$ by a first weight-coefficient-multiplication unit 9-8 and a second weight-coefficient-multiplication unit 9-9, respectively. Weighted-average units 9-10 then obtain accurate transmission-line estimates $F_1$, $F_2$, and so on based on the weighted transmission-line estimates.

Complex conjugates (*) of the transmission-line estimates $F_1$, $F_2$, and so on output from the weighted-average units 9-1 are multiplied by the data symbols $X_1(i)$, $X_2(i)$, and so on, respectively, by multiplying units 9-11. Results of the multiplications are subjected to rake-diversity combining by a combining unit 9-12 so as to generate a rake-combined signal X(i) with a threshold value so as to supply finally decided data, which is output as demodulation data rdata(i).

In this manner, the pilot-based transmission-line estimates are provided with the weight $W_1$, and the data-based transmission-line estimate are given the weight $W_2$ ($W_1 > W_2$) in order to produce a weighted average. This provides accurate transmission-line estimates $F_1$, $F_2$, and so on in accordance with reliability of the tentatively decided data.

Figure 10:
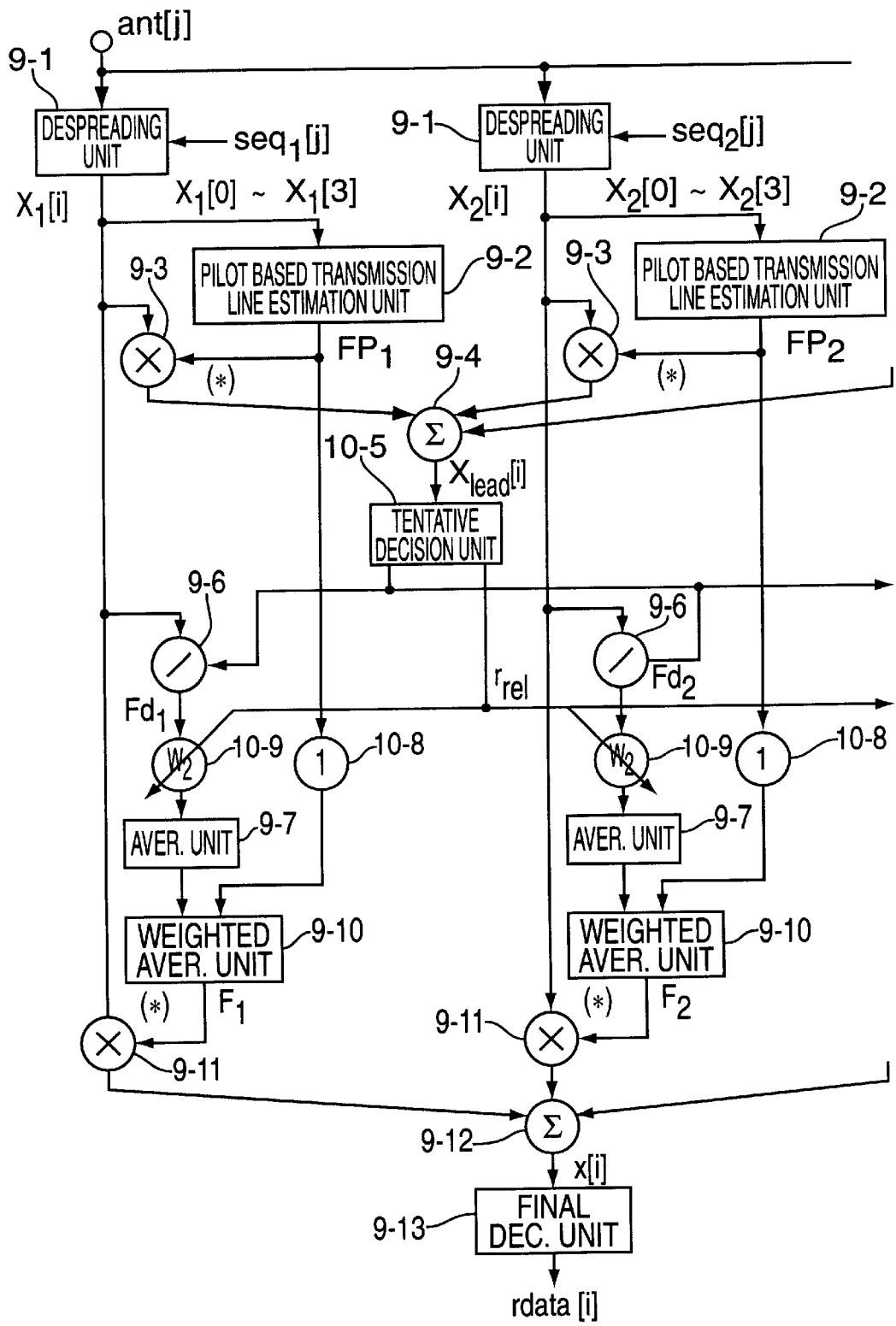
FIG. 10 is a drawing showing functional blocks of the second embodiment of the present invention.

FIG. 10 shows functional blocks of the second embodiment according to the present invention. In FIG. 10, the same functional elements as those of FIG. 9 are referred to by the same numerals, and a description thereof will be omitted. A configuration of FIG. 10 differs from that of FIG. 9 in a tentative-decision unit 10-5 as well as first and second weight-coefficient-multiplication units 10-8 and 10-9.

The tentative-decision unit 10-5 functions in the same manner as the tentative-decision unit of FIG. 9 to output the tentatively decided data $rdata_{temp}(i)$. Further, the tentative decision unit 10-5 performs a soft decision with respect to the received data symbols $X_1(i)$, $X_2(i)$, and so on, and outputs a signal $r_{rel}$ indicative of a reliability of the tentatively decided data (i.e., a probability P(A|r) of a correct decision based on the amplitude components of the soft decision.

The first weight-coefficient-multiplication unit 10-8 has a fixed weight (e.g., 1 as in this example), and the second weight-coefficient-multiplication unit 10-9 has a weight $W_2$ which varies in accordance with the signal $r_{rel}$ indicative of a reliability of the tentatively decided data. In this manner, a ratio of the weight attached to the pilot-based transmission-line estimate to the weight attached to the data-based transmission-line estimate is changed according to the reliability of the tentatively decided data, so that the weighted-average units 9-10 can provide more accurate transmission-line estimates.

Reliability can differ for each data symbol. In consideration of this, the second weight-coefficient-multiplication units 10-9 are provided at a stage prior to the averaging units 9-7, so that each data symbol is provided with a respective weight before the averaging operation.

Figure 11:
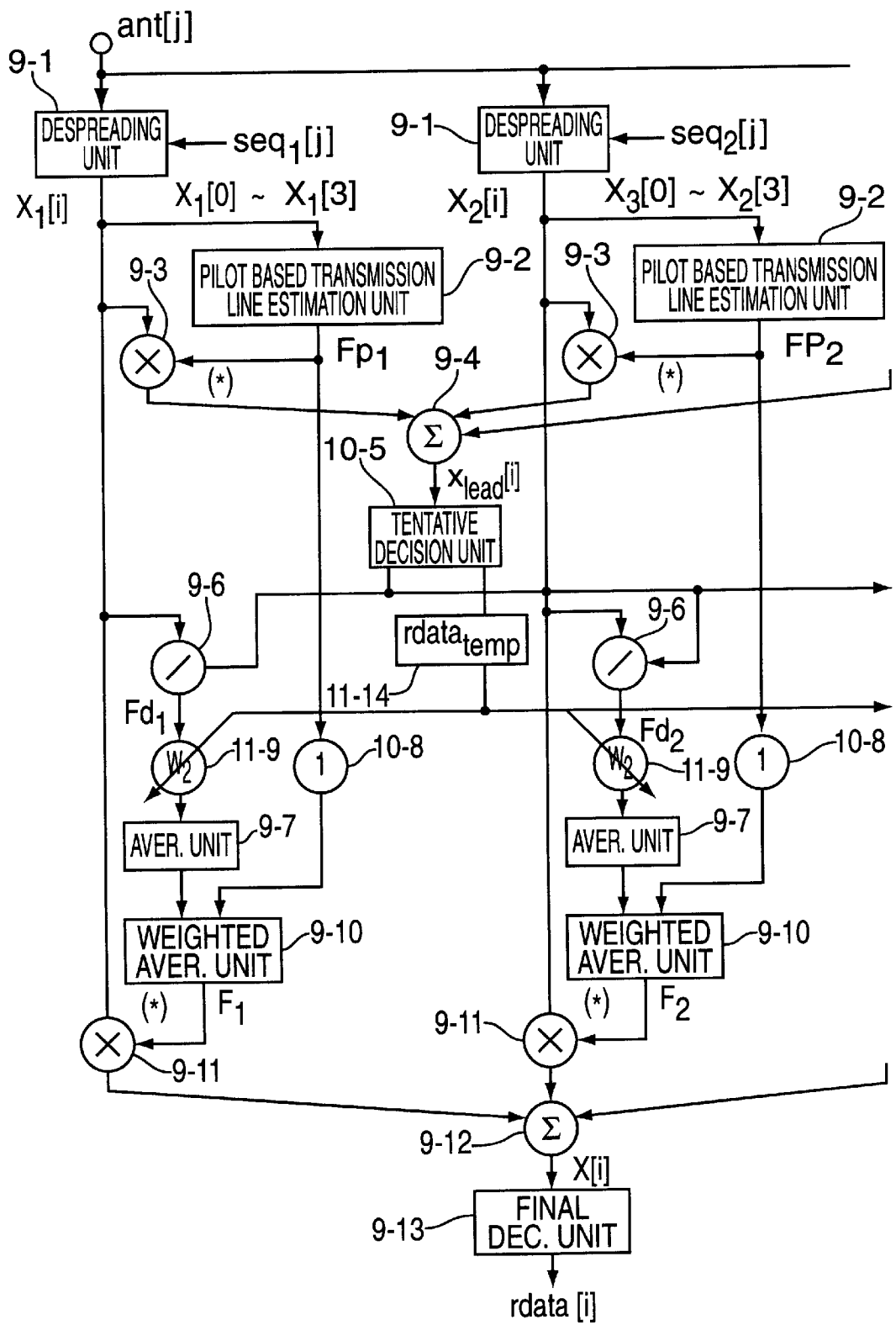
FIG. 11 is a drawing showing functional blocks of the third embodiment of the present invention.

FIG. 11 shows functional blocks of the third embodiment according to the present invention. In FIG. 11, the same functional elements as those of FIG. 10 are referred to by the same numerals, and a description thereof will be omitted. A configuration of FIG. 11 differs from that of FIG. 10 in that a reliability decision unit 11-14 is provided at the soft-decision output of the tentative-decision unit 10-5, and in that the second weight-coefficient-multiplication units 11-9 are provided.

In the embodiment of FIG. 11, reliability of the tentatively decided data (i.e., the probability (A|r) of a correct decision) is obtained based on amplitude components obtained from the soft decision by the tentative-ascertainment unit 10-5. This operation is the same as that of FIG. 10. In the configuration of FIG. 11, however, the reliability decision unit 11-14 does not obtain a value of the reliability (P(A|r). The reliability decision unit 11-14 checks whether the reliability (P(A|r)) of the tentatively decided data is larger than a predetermined value (e.g., 0.5), and outputs a result of the check.

The second weight-coefficient-multiplication units 11-9 operates differently, depending on the output of the reliability decision unit 11-14. When the reliability (P(A|r)) of the tentatively decided data is larger than the predetermined value (e.g., 0.5), the weight $W_2$ is set to a relatively large value. Otherwise, the weight $W_2$ is set to a relatively small value. As specific examples of values of the weight $W_2$, the relatively large value may be set to 1, and the relatively small value may be set to 0, thereby reducing the computation load of the weight operation.

The embodiments described above are related to a system of a pilot-insertion type in which pilot symbols are transmitted along with data symbols by using time-division multiplexing. The present invention is equally applicable to a system of a pilot-exterpolation type in which pilot symbols are transmitted by using different codes from those of data symbols and using code-division multiplexing. Even in such a system, pilots and tentatively ascertained data may be used, and weights are attached in accordance with reliability, thereby providing an accurate estimate of the transmission line.

Figure 12:
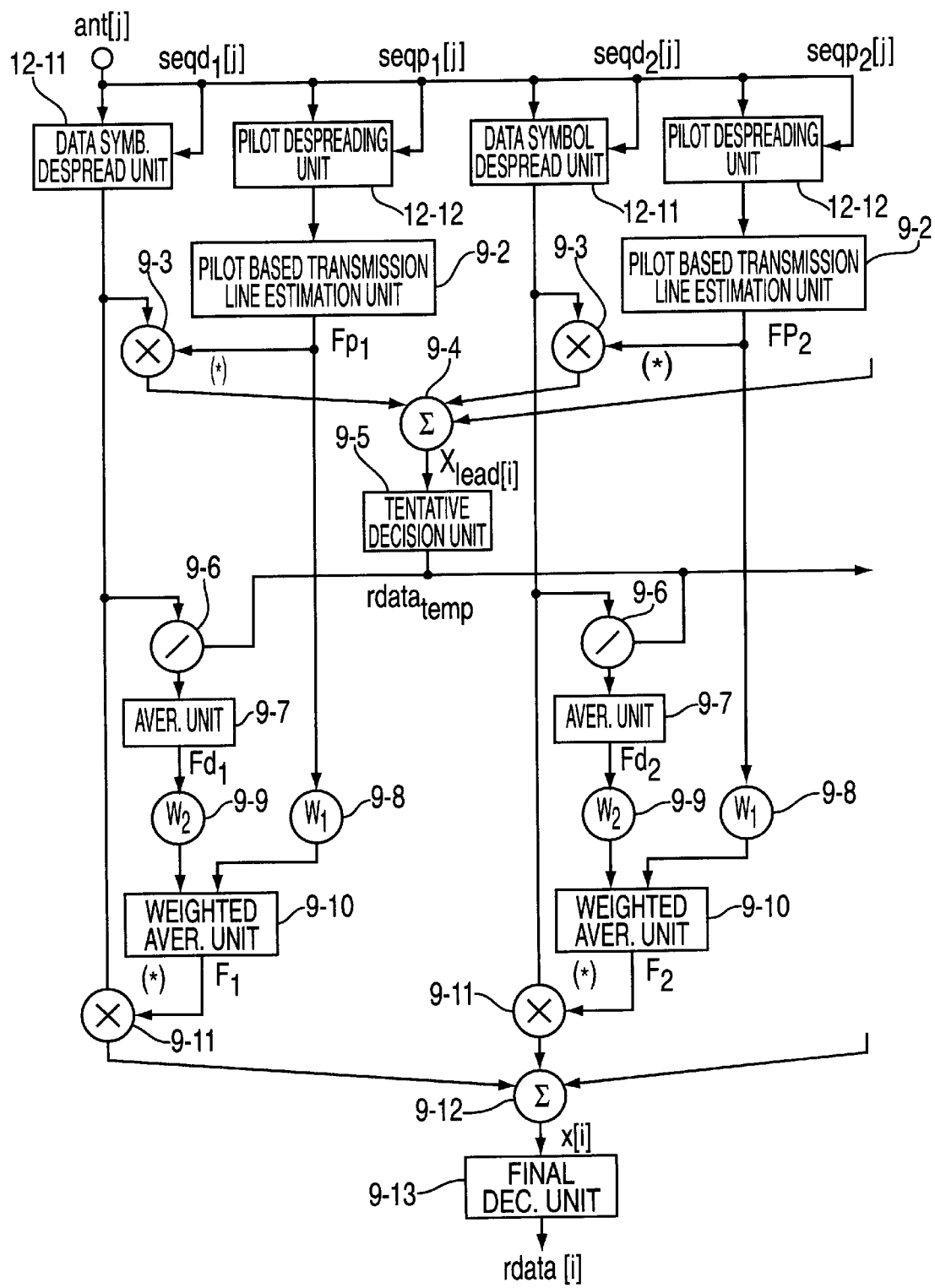
FIG. 12 is a drawing showing functional blocks of an embodiment of the present invention when a pilot-exterpolation scheme is employed.

FIG. 12 shows functional blocks of an embodiment of the present invention when a pilot-exterpolation scheme is employed. A signal received by an antenna is supplied to data-symbol despreading units 12-11 and pilot despreading units 12-12 as a complex array ant(j). The data-symbol despreading units 12-11 and the pilot despreading units 12-12 are provided for corresponding paths of the multiplexed transmission line, and apply despreading by using data-symbol-despreading codes $seqd_1(j)$, $seqd_2(j)$, ..., and pilot-symbol-despreading codes $seqp_1$, $seqp_2(j)$, ..., respectively, all of which have different timings from each other. As a result, base-band received data symbols $X_1(i)$, $X_2(i)$, and so on as well as pilot symbols $P_1(i)$, $P_2(i)$, and so on are obtained as outputs.

In this manner, codes to be subjected to the despreading include despreading codes regarding data symbols (data channels) and despreading codes regarding pilot symbols (pilot channels). Except this, the embodiment directed to the pilot-exterpolation scheme has the same functional blocks as the first embodiment of the present invention shown in FIG. 9. A description of this embodiment will be thus a duplicate of what has been already described, and will be omitted.

By the same token, the second and third embodiments having functional blocks shown in FIGS. 10 and 11, respectively, can be easily modified so that they can be applied to the pilot-exterpolation scheme based on the code-division-multiplexing pilot channel. In this manner, the present invention is applicable not only to a communication scheme in which pilot signals are multiplexed via time division but also to a communication scheme in which pilot signals are code-division multiplexed.

A fourth embodiment of the present invention is not shown in a figure as functional blocks. Parameters of the fourth embodiment supplied to a demodulator include not only an array of a signal received by an antenna but also a mode of data transmission regarding signals to be received. These parameters control what codes are used for despreading and what positions the pilot symbols have. As previously described, reliability of the tentatively decided data varies depending on the types of the data-transmission modes. In consideration of this, weights attached to pilot-based transmission-line estimates and data-based transmission-line estimates need to be switched in accordance with the mode of data transmission. A function to achieve this is provided in this embodiment.

Figure 13:
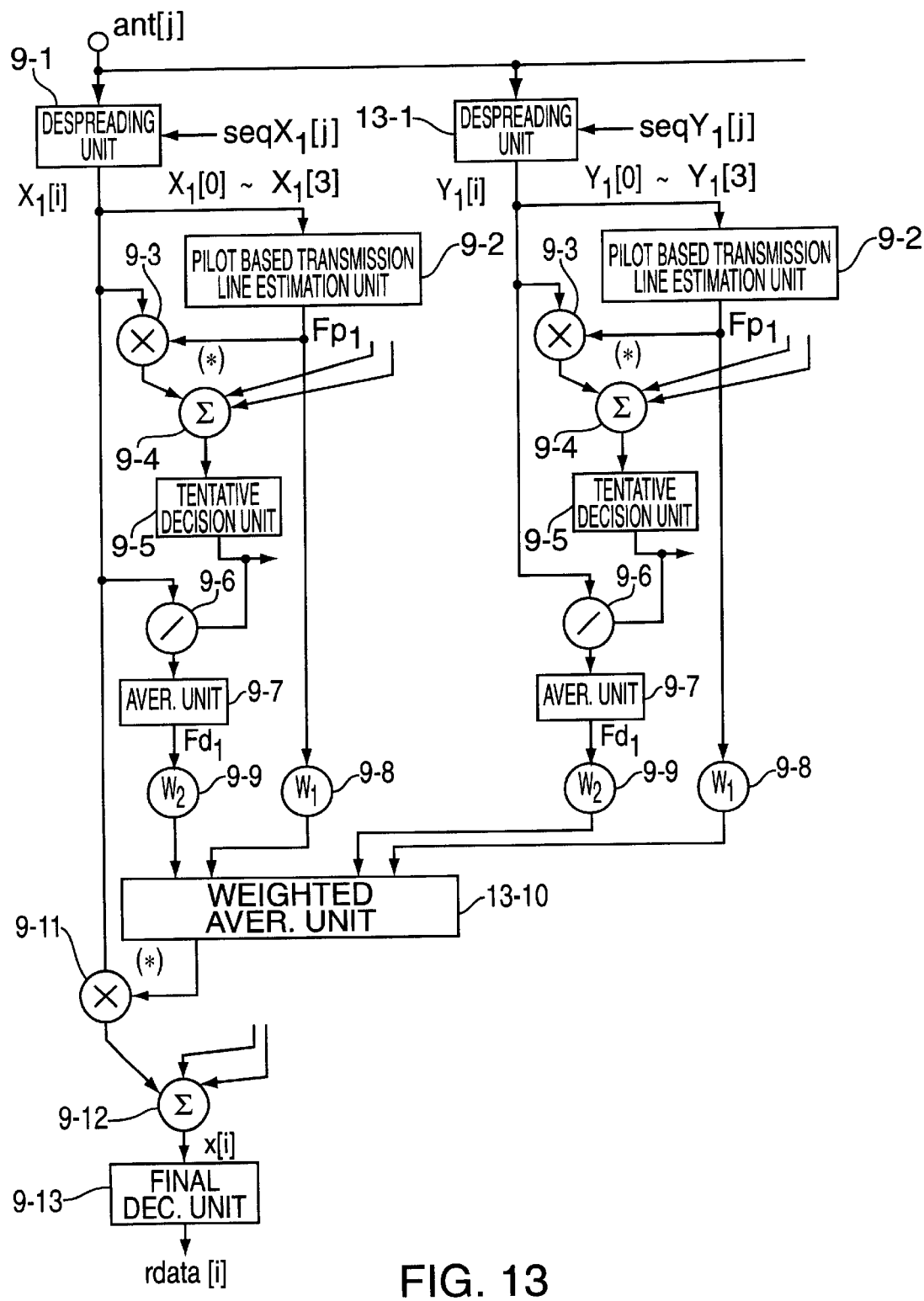
FIG. 13 is a drawing showing functional blocks of the fifth embodiment of the present invention.

FIG. 13 shows functional blocks of the fifth embodiment according to the present invention. In FIG. 13, the same elements as those of FIG. 9 are referred to by the same numerals, and a description thereof will be omitted if it has been already given. A configuration of FIG. 13 differs form that of FIG. 9 in that a signal directed to another receiver or transmitted through another code channel is supplied to a despreading unit 13-1. The despreading unit 13-1 applies despreading by using despreading codes seqY(j) to generate based-band signals $Y_1(i)$, ..., which are directed to another receiver or transmitted through another code channel, are supplied to the functional blocks similar to those previously described to obtain pilot-based transmission-line estimates and data-based transmission-line estimates. A third weight $W_3$ is then attached to the pilot-based transmission-line estimate that is derived from the signal directed to another receiver or transmitted through another code channel, and a fourth weight $W_4$ is attached to the data-based transmission-line estimate. A weighted-average unit 13-10 obtains a weighted average of these estimates, thereby providing a reliable transmission-line estimate.

Figure 14:
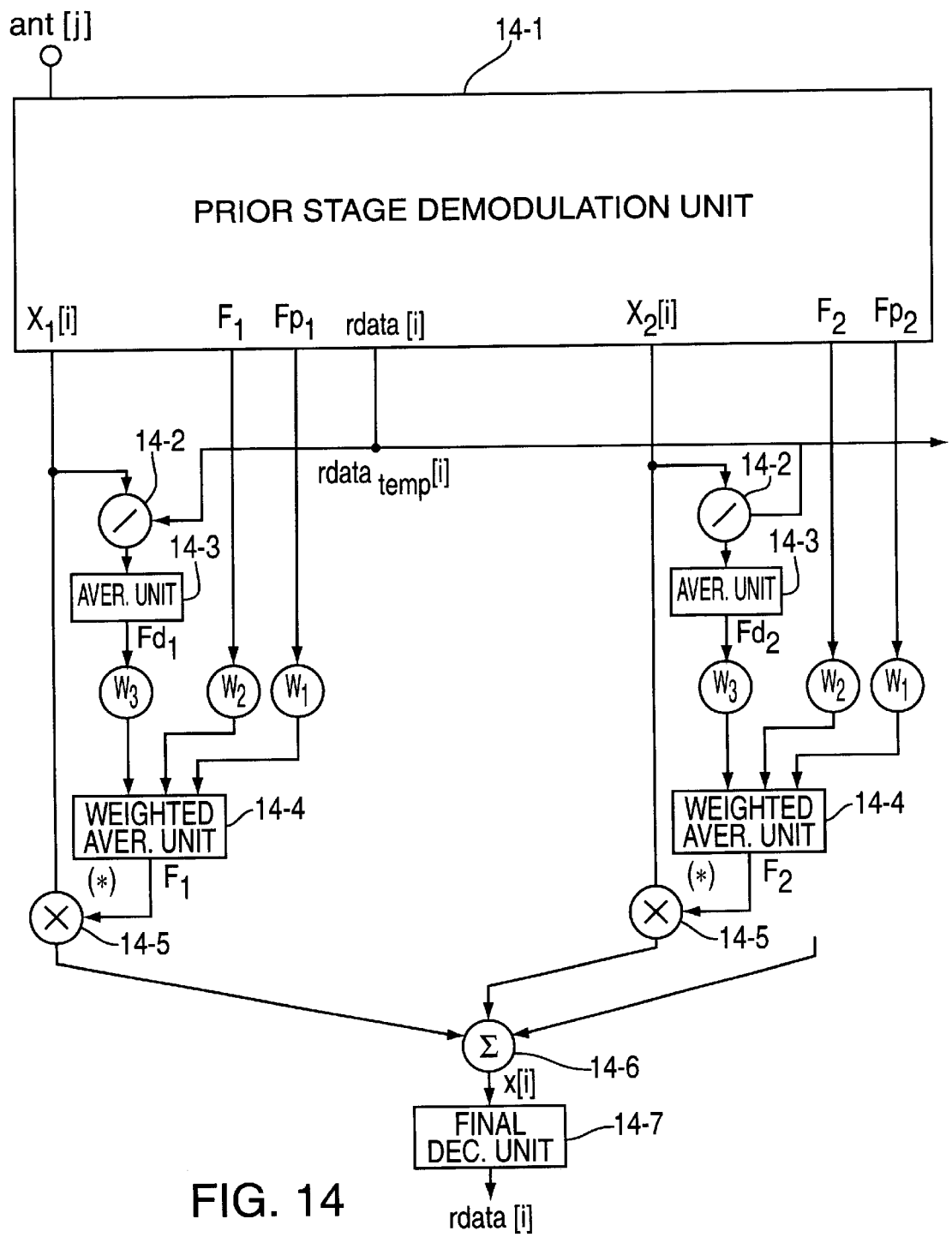
FIG. 14 is a drawing showing functional blocks of the sixth embodiment of the present invention.

FIG. 14 shows functional blocks of the fifth embodiment according to the present invention. In this figure, a prior-stage demodulation unit 14-1 decides received data by employing weights used in the first to fifth embodiment shown in FIG. 9 through FIG. 13, respectively, or by employing a combination of these weights.

The prior-stage demodulation unit 14-1 supplies received symbols $X_1(i)$, $X_2(i)$, and so on, pilot&data-based transmission-line estimates $F_1$, $F_2$, and so on, pilot-based transmission-line estimates $Fp_1$, $Fp_2$, and so on, and finally decided data rdata(i). Based on the finally decided data rdata(i), dividing units 14-2 and averaging units 14-3 obtain data-based transmission-line estimates $Fd_1$, $Fd_2$, ... Here, the finally decided data of the prior-stage demodulation unit 14-1 is treated as tentatively-decided data at a subsequent stage.

The data-based transmission-line estimates $Fd_1$, $Fd_2$, ... are multiplied by a weight $W_3$. The pilot&data-based transmission-line estimates $F_1$, $F_2$, ... that are supplied from the prior-stage demodulation unit 14-1 are multiplied by a weight $W_2$. Further, the pilot-based transmission-line estimate $Fp_1$, $FP_2$, ... that also come from the prior-stage demodulation unit 14-1 are multiplied by a weight $W_1$. Here, these weights are provided in accordance with the reliability. A weighted-average unit 14-4 obtains a weighted average of these estimates to generate pilot&data-based transmission-line estimates $F_1$, $F_2$, .... Complex conjugates (*) of the newly generated transmission-line estimates $F_1$, $F_2$, ... are multiplied by the received symbols $X_1(i)$, $X_2(i)$, ... by multiplying units 14-5. Results of the multiplications are subjected to rake-diversity synthesis by a synthesizing unit 14-6. A final-decision unit 14-7 then attends to a final decision of data, thereby producing demodulated data rdata (i) as an output.

The demodulated data rdata(i) of the final-decision unit 14-7 is then treated as finally decided data rdata(i) of the prior-stage demodulation unit 14-1, and the same procedure as described above is recursively repeated many times, thereby achieving many stages of tentative data decisions and transmission-line estimation. This enhances accuracy of the transmission-line estimates and the decided data.

Further, a different method may be employed for determining weights in accordance with the reliability of the tentatively decided data at each stage. Namely, an error rate of the tentatively decided data with respect to the finally decided data is obtained at each stage by comparing the tentatively decided data with the finally decided data. The error rate of the tentatively decided data is then derived from an error rate of the finally decided data when this rate is obtained by simulation or the like, thereby providing a reliability measure.

As described above, the present invention estimates transmission-line characteristics by using tentatively decided data symbols as well as pilot symbols. Because of this, the present invention can obtain an accurate transmission-line estimate without a need to increase the number of pilot symbols or without incurring a delay amounting to more than one slot. Further, since a weighted average is obtained by changing weights attached to the pilot-based transmission-line estimates and the data-based transmission-line estimates in accordance with the reliability of the tentatively decided data, accuracy can be further enhanced with regard to an average obtained from the pilot&data-based transmission-line estimates.

Accordingly, the present invention can demodulate data symbols by using a highly accurate transmission-line estimate, making it less likely to have demodulated data suffering an error in digital data communication. This achieves high-quality digital-data communication.

What is claimed is:

1. A demodulator for demodulating data symbols by estimating transmission-line characteristics from received a pilot symbol, comprising:

a pilot-based transmission-line-estimation unit for estimating the transmission-line characteristics by using the pilot symbol;

a tentative-data-decision unit for tentatively deciding the data symbols based on a transmission-line estimate that is output from said pilot-based transmission-line estimation unit;

a data-based transmission-line estimation unit for estimating the transmission-line characteristics by using tentatively decided data output from said tentative-data-decision unit;

multiplying units for multiplying the transmission-line estimate output from said pilot-based transmission-line estimation unit and a transmission-line estimate output from said data-based transmission-line estimation unit by respective weights;

a pilot&data-based transmission-line estimation unit for obtaining a transmission-line estimate by averaging weighted transmission-line estimates output from said multiplying units; and a final-data decision unit for finally deciding the data symbols by using the transmission-line estimate output from said pilot&data-based transmission-line estimation unit.

2. The demodulator of claim 1, wherein the respective weights of said multiplying units have a ratio varying in accordance with reliability of the tentatively decided data.

3. The demodulator of claim 1, wherein said tentative-data-decision unit includes a soft-decision unit for providing a signal indicative of reliability of the tentatively decided data based on a result of a soft decision of the received data symbols.

4. The demodulator of claim 3, wherein one of the respective weights of said multiplying unit is changed in accordance with the signal indicative of reliability of the tentatively decided data.

5. The demodulator of claim 3, wherein the signal indicative of reliability of the tentatively decided data represents at least two different reliability levels.

6. The demodulator of claim 5, wherein one of the respective weights are step changed in accordance with the signal representing the at least two different reliability levels.

7. The demodulator of claim 1, further comprising a transmission-mode-check unit for checking a transmission mode of digital-data-transmission signals, wherein said transmission-mode-check unit outputs a signal indicative of reliability of the tentatively decided data where the reliability varies depending on the transmission mode, and the respective weights of said multiplying units have a ratio varying depending on the signal indicative of reliability of the tentatively decided data supplied from the transmission-mode-check unit.

8. The demodulator of claim 1, wherein by receiving and demodulating signals directed to other receivers or transmitted via other code channels when the signals are transmitted from a single transmission source, said pilot-based transmission-line estimation unit, data-based transmission-line estimation unit, and said multiplying units are provided with a signal directed to a receiver of said demodulator and the signals directed to other receivers or transmitted via other code channels, and wherein said pilot&data-based transmission-line estimation unit obtains a weighted average of the pilot-based transmission-line estimation and the data-based transmission-line estimate in accordance with the reliability of the tentatively decided data with respect to all signals including the signal directed to the receiver of said demodulator and the signals directed to other receivers or transmitted via other code channels, thereby obtaining a transmission-line estimate.

9. A demodulator for demodulating data symbols by estimating transmission-line characteristics from received a pilot symbol, comprising:

a pilot-based transmission-line-estimation unit for estimating the transmission-line characteristics by using the pilot symbol;

a first tentative-data-decision unit for tentatively deciding the data symbols based on a transmission-line estimate that is output from said pilot-based transmission-line estimation unit;

a first data-based transmission-line estimation unit for estimating the transmission-line characteristics by using tentatively decided data output from said first tentative-data-decision unit;

first multiplying units for multiplying the transmission-line estimate output from said pilot-based transmission-line estimation unit and a transmission-line estimate output from said first data-based transmission-line estimation unit by respective weights, in accordance with reliability of the tentatively decided data;

a first pilot&data-based transmission-line estimation unit for obtaining a transmission-line estimate by averaging weighted transmission-line estimates output from said first multiplying units; and a second tentative-data-ascertainment unit for tentatively deciding the data symbols again based on the transmission-line estimate that is output from said first pilot&data-based transmission-line estimation unit;

a second data-based transmission-line estimation unit for estimating the transmission-line characteristics by using tentatively decided data output from said second tentative-data-ascertainment unit;

second multiplying units for multiplying the transmission-line estimate output from said pilot-based transmission-line estimation unit, the transmission-line estimate output from said first data-based transmission-line estimation unit, and a transmission-line estimate output from said second data-based transmission-line estimation unit by respective weights varying in accordance with reliability of the tentatively decided data;

a second pilot&data-based transmission-line estimation unit for obtaining a transmission-line estimate by averaging weighted transmission-line estimates output from said second multiplying units; and a final-data-decision unit for finally deciding the data symbols by using the transmission-line estimate output from said second pilot&data-based transmission-line estimation unit.

10. The demodulator of claim 9, wherein said first and second tentative-data-decision units, said first and second data-based transmission-line estimation units, said first and second multiplying units, and said first and second pilot&data-based transmission-line estimation units perform tentative data decision, estimation of the transmission-line characteristics based on the tentatively decided data, multiplication of the respective weights varying in accordance with reliability of the tentatively decided data or the respective weights varying in accordance with reliability of the tentatively decided data and depending on which stage a current stage is, and estimation of the transmission-line characteristics based on the pilot and tentatively decided data.

11. A method for demodulating data symbols by estimating transmission-line characteristics from received a pilot symbol, the method comprising the steps of:

estimating the transmission-line characteristics by using the pilot symbol to produce a first transmission line estimate;

tentatively deciding the data symbols based on the first transmission-line estimate to produce tentatively decided data;

estimating the transmission-line characteristic by using the tentatively decided data to produce a second transmission line estimate;

multiplying the first and second transmission-line estimate by respective weights to produce weighted transmission line estimates;

averaging the weighted transmission-line estimates to produce a third transmission-line estimate; and finally deciding the data symbols by using the third transmission-line estimate.

12. The method of claim 11, wherein the respective weights have a ratio varying in accordance with reliability of the tentatively decided data.

13. The method of claim 11, wherein the tentatively deciding the data symbols includes a soft decision for providing a signal indicative of reliability of the tentatively decided data.

14. The method of claim 13, wherein one of the respective weights is changed in accordance with the signal indicative of reliability of the tentatively decided data.

15. The method of claim 13, wherein the signal indicative of reliability of the tentatively decided data represents at least two different reliability levels.

16. The demodulator of claim 15, wherein one of the respective weights are step changed in accordance with the signal representing the at least two different reliability levels.

17. The method of claim 11, further comprising a step of checking a transmission mode of digital-data-transmission signals and providing a signal indicative of reliability of the tentatively decided data where the reliability varies depending on the transmission mode, and the respective weights have a ratio varying depending on the signal indicative of reliability of the tentatively decided data supplied.

* * * * *